(12) United States Patent
Church et al.

(10) Patent No.: US 6,684,171 B2
(45) Date of Patent: Jan. 27, 2004

(54) IN-SITU STRIPE HEIGHT CALIBRATION OF MAGNETO RESISTIVE SENSORS

(75) Inventors: Mark A. Church, Los Gatos, CA (US); Alain Michel Louis Desouches, Santa Cruz, CA (US); Richard E. Krebs, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/127,198

(22) Filed: Apr. 22, 2002

(65) Prior Publication Data

US 2003/0200041 A1 Oct. 23, 2003

(51) Int. Cl.$^7$ .......................... G06F 19/00; B24B 49/00
(52) U.S. Cl. ............................ 702/104; 702/57; 451/5; 451/10
(58) Field of Search .................. 702/57, 58, 81–82, 702/85, 90, 104, 179, 189; 451/1, 5, 8–10; 29/603.09, 603.13, 603.16

(56) References Cited

U.S. PATENT DOCUMENTS

| | | | |
|---|---|---|---|
| 4,914,868 A | | 4/1990 | Church et al. |
| 5,361,547 A | * | 11/1994 | Church et al. ............... 451/5 |
| 5,531,017 A | | 7/1996 | Church et al. |
| 5,597,340 A | * | 1/1997 | Church et al. ............... 451/5 |
| 5,876,264 A | * | 3/1999 | Church et al. ............... 451/5 |
| 5,991,698 A | | 11/1999 | Hao et al. |
| 6,027,397 A | | 2/2000 | Church et al. |
| 6,174,218 B1 | | 1/2001 | Church et al. |
| 6,193,584 B1 | | 2/2001 | Rudy et al. |

\* cited by examiner

*Primary Examiner*—Bryan Bui
(74) *Attorney, Agent, or Firm*—Robert B. Martin; Bracewell & Patterson, L.L.P.

(57) ABSTRACT

An in-situ (result-directed/predictive) MR stripe height calibration method capable of operating on the fly during lapping operation. The method involves utilization of an interval sampling technique, which provides a high number of data points. The data provided are filtered and averaged at each kerf location to provide a much higher calibration accuracy than previously available. The primary advantage is to create an accurate relationship between MR element resistance and its stripe height while the MR element is being lapped. The method thus provides the ability to target either resistance or stripe height or a combination of both during the lapping process. Finally, the system is completely self-contained and does not required wafer data.

33 Claims, 10 Drawing Sheets

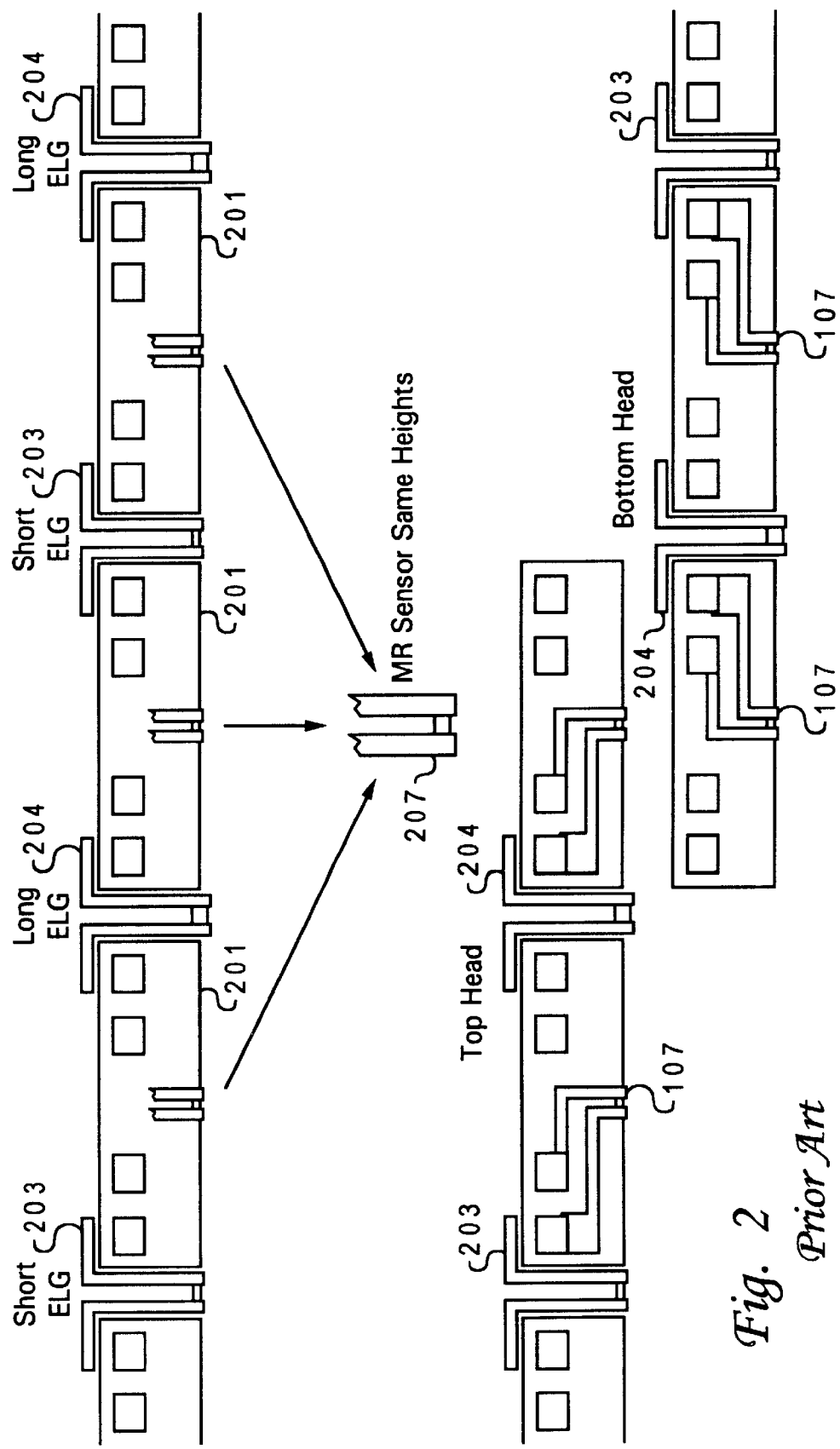
Fig. 2 *Prior Art*

Unlapped

MR Tail

Section View

Curved upper and lower edges before lapping with "ion milled tails"

Lapped

Curved upper edge with "ion milled tail" and straight lower edge after lapping without "ion milled tail"

IN-SITU STRIPE HEIGHT CALIBRATION OF MAGNETO RESISTIVE SENSORS

BACKGROUND OF THE INVENTION

1. Technical Field

The present invention relates generally to magneto resistive elements and in particular to stripe height calibration of magneto resistive elements. Still more particularly, the present invention relates to a method and system for performing accurate, result-directed/predictive stripe height versus resistance calibration of magneto resistive sensors during lapping operation.

2. Description of the Related Art

Many direct access storage device manufacturers employ thin film magnetic recording heads. Conventional thin film read/write heads in data storage systems generally include an inductive write head in combination with either an inductive or magneto resistive (MR) read head. One type of MR/inductive head includes an inductive write head formed adjacent to a MR read head. In manufacturing such heads, rows of magnetic recording transducers are deposited simultaneously on wafer substrates using semiconductor type process methods. Subsequent to these depositions, the wafers are fabricated into rows of single element heads called slider rows. When separated from the slider rows, each slider contains magnetic read/write components and an air-bearing surface configured to aerodynamically "fly" over the surface of a spinning magnetic disk medium. The rows are separated by kerfs that facilitate subsequent slicing into individual sliders.

Commonly assigned U.S. Pat. No. 5,531,017 describes the process by which a wafer consisting of multiple slider rows is divided into quads of 29 slider rows prior to completing the lapping process. A number of such rows of sliders are deposited together onto a single semiconductor-type wafer, which is then cut into pieces commonly termed "wafer quadrants" (or just "quadrants"). A wafer quadrant is then bonded onto an extender tool (also sometimes known as a row tool, transfer tool, or support bar) and the foremost slider row is lapped as a unit on an abrasive surface, such as a plate coated with an appropriate slurry mix. The slider row is then cut from the wafer quadrant, so that lapping of a new foremost slider row may commence. The sliced off row of sliders is ready for additional manufacturing steps, dicing into individual sliders, and then the final steps which ultimately produce working disk drive heads.

As a further enhancement to this process, commonly assigned U.S. Pat. No. 6,174,218 describes the manner in which the quads are placed on an extender tool that is bendable so that the slider rows may be straightened out while the lapping operation is being completed. This process of bending the quad while lapping is also referred to as a bow compensated lapping (BCL) process. Extender tools provide a mechanism for holding the row of sliders while lapping or grinding operations are performed to produce an air bearing surface. Typically the slider rows distort from a co-linear line according to the internal stress of the wafer material and the surface stresses developed when reducing the wafers to slider rows. Further distortion of the rows of sliders from a co-linear line can occur as a result of the tool bonding operation. The combined stress distortion and bonding distortion of slider rows results in a total distortion or curvature condition called row bow.

Row bow may cause a row of sliders to be non-uniformly lapped during the lapping process. As such, this row bow condition can detrimentally affect critical head performance parameters, such as stripe height in MR heads, and throat height in inductive heads. To achieve optimum performance of MR/inductive heads, both the stripe height and throat height must be tightly controlled.

In order to control the amount of lapping performed on a slider row and to accurately determine the final MR element height (at the conclusion of lapping), the resistance must be known. Thus, the lapping process is controlled by the measured resistance of the MR elements in a slider row. The measured resistances are used for controlling the degree of lapping for each of the MR elements in a slider row to compensate for row bow. The electrical resistance is related to the desired MR element height (also referred to as stripe height), and the lapping process is terminated when the desired MR element height is reached.

FIGS. 1 and 2 illustrate two current configurations of lapping control systems, which both utilize resistance measurements to control the lapping process. In FIG. 1, a dual element, wire bonded electrical lapping guide (ELG) 103 (with both long or short elements) is placed in each kerf between MR elements 101 in a slider row. The MR elements are wire bonded to electrical contacts so that the resistance can be measured. This configuration is primarily utilized with wafers having a density of 36 slider rows and relatively large kerfs.

With the introduction of higher density wafer designs (e.g., the 44 slider row per wafer designed by International Business Machines), the increased row density resulted in narrower kerfs and restricted the placement of the dual element ELG studs in the kerfs. The dual element ELGs were therefore replaced with alternating long and short ELGs placed in adjacent kerfs. Thus, as shown in FIG. 2, the long ELGs 204 and short ELGs 203 were placed within the kerfs of MR elements 201 and utilized in the calibration process.

Further development in calibration systems led to the introduction of row level kiss lap (or flatness control lapping), which made it necessary to utilize element predicted stripe height for process control. However, at this juncture, it was discovered that due to lead current crowding and other physical characteristics in current MR devices, simple linear calibration methods no longer produced valid and/or accurate results.

In response, a higher order method of calibration called (abc) (i.e., calibration in which the constants of a quadratic equation are first determined) was introduced, which utilizes wafer resistance data (from MR elements) and resistance and stripe height data after a first BCL operation. One problem with this technique is that it is greatly compromised by the lack of MR resistance sensitivity to stripe height at the wafer level.

Another problem is that the technique mixes data from unlike structures. Thus, wafer element data utilized has unlapped and undisturbed edges as illustrated in FIG. 3B, while the same element measured after lapping (shown in FIG. 3C) has a lower stripe edge that provides completely different data from the wafer data structures of FIG. 3B. This difference is depicted by the graph on FIG. 3A. Thus, a non-linearity exists, which affects the results of the lapping operation.

Still another problem with using post-BCL data to calibrate MR elements is that post-BCL calibration can only be determined after first lapping the rows. Since, for accurate results, it is preferred to complete lapping based on measure resistance and stripe height (i.e., result-directed/predictive lapping), element calibration after BCL is too late.

Because of the above stated issues/problems with current (abc) lapping processes, the (abc) method does not provide adequate methods for result-directed/predictive lapping and is not an adequate calibration method for carrier stripe height control to the 0.05 micron 3 sigma regime required for the newer products being produced in 2002 and beyond.

The present invention thus realizes that it would be desirable to provide a method and lapping control system/process that provides more accurate responses to and/or representation of the relationship between resistance and stripe height of magneto resistive elements being lapped. A method and lapping control system that enables in-situ (predictive) calibration of the lapping operation on MR elements utilizing accurate, predicted relationship data between stripe height and resistance would be a welcomed improvement. It would be further desirable to provide a calibration system design that enables collection of more accurate resistance data without wire bonding for utilization in result-directed/predictive calibration. These and other benefits are provided by the invention described herein.

SUMMARY OF THE INVENTION

Disclosed is an in-situ (result-directed/predictive) magneto resistive (MR) stripe height calibration method capable of operating on-the-fly during lapping operation. The method involves utilization of an interval sampling technique, which provides a high number of data points on each row of thin film magneto resistive devices. The high number of data points are collected by interpolating data during a lapping operation using element-like ELGs (ELEs). The high number of data points generated are filtered and averaged at each key location to provide a much higher calibration accuracy than previously available. The primary advantage is to create an accurate relationship between MR element resistance and its stripe height while the MR element is being lapped. The method thus provides the ability to target either resistance or stripe height or a combination of both during the lapping process. Finally, the calibration system is completely self-contained and does not require wafer data.

Key to the invention is the design and utilization of element like ELGs (ELEs) which are strategically placed in alternating kerfs to provide significantly more accurate resistance data sensors. Thus, approximately half of the kerfs are populated with ELEs. The lapped head of the ELEs are made similar to the MR sensors. Use of the ELEs eliminates the need for wire bonding of the ELGs to the MR sensors as was done in the prior art. In the illustrative embodiments, the ELEs are placed in between a long and short ELG. The ELGs are utilized to calibrate stripe height and the ELEs are utilized (along with the MR sensors) to measure resistance corresponding to ELG stripe height. The collected data is analyzed by the controller/processor, which generates the constants that are used for determining stripe height by ELE or element resistance. These constants may define a linear, exponential, polynomial, power, or other relationship between stripe height and resistance.

In preferred embodiments, ELEs stripe heights are located lower than the MR elements. This allows for ELE resistance data collected at stripe heights that are equal to or lower than nominal stripe heights at the second lapping operation (kiss lap). If positioned equal to final kiss lap operation, first lapping operation can be terminated by desired final kiss lap resistance by ELEs when in resist lapping mode. If positioned lower than final kiss lap operation, for example at lower stripe height limit, ELE resistance will pass through nominal resistance, to preview final resistance before termination of first lapping operation. Ultimately ELEs located lower than MR devices provide a means for superior (abc) calibration because resistance data collected, covers more of, or all of the final stripe height distributions. It is by this means that proposed (abc) calibration better accounts of non-linearity between ELGs and ELEs.

The stripe height data is collected utilizing a plurality of electrical lapping guides (ELGs) and the resistive data values are simultaneously collected utilizing the ELEs. The ELEs are positioned in alternating kerfs with the ELGs and in the preferred embodiment, are positioned with their sensors at a predetermined height below the level of the MR element. The invention thus enables the lapping operation to preview MR element resistance and stripe height at their final post kiss lap target. The ELEs read values of resistance to derive the calibration constants. The constants are fed forward to the next lapping operation to determine the stripe height using the MR resistance values. The higher density ELE collection leads to predictive capability. According to one embodiment, the ELEs are positioned at a lower vertical level than the MR elements. The ELE MR back edge distance below the MR element back edge is equal to the MR material removal of the next lapping operation. This permits the calibration system to be utilized to predict the resistance results prior to the final kiss lapping, and thus enables a better predictive lapping operation.

The calibration algorithm thus performs an interpolation between the ELEs (and not an extrapolation as would be required when the ELEs are placed at the row level). Once the accurate relationship is calculated, however, calibration/adjustment of the lapping components (e.g., actuators) is passed to the ELEs. Each lapping operation laps to the ELEs and accurate data is collected. A more accurate prediction of resistance versus stripe height relationship is thus provided.

As recited within the claims, the invention provides a method for enhancing calibration of magneto resistive (MR) elements formed on a wafer during lapping of the MR elements. The method comprises: (1) collecting a high frequency sampling of data related to element resistance and stripe height of the MR element at a row level of the wafer during an ongoing lapping operation; (2) analyzing the data to determine accurate relationship characteristics between stripe height and resistance of the MR element; (3) providing a result of the analysis to a calibration component utilized to control lapping parameters and adjustment of lapping dimensions; and (4) dynamically controlling the lapping operation on the MR element utilizing the results with a MR sensor component (i.e., ELEs) to make adjustments to the lapping dimensions.

Operation of the invention is completed via an apparatus/system for performing in-situ calibration of stripe height and resistance characteristics of a deposited thin film resistive material. The system comprises: (1) a plurality of thin film resistive elements of the thin film resistive material having a height dimension and corresponding resistance, where the plurality of resistive elements are configured in slider rows on a quad, each separated by a kerf; (2) a plurality of elements like ELGs (ELEs) placed in alternating keys for measuring the resistance of each resistive element; (3) an electrical contact system comprising alternating ELGs and ELEs located in kerfs between elements and spaced to provide a large number of contact points; (4) a recording mechanism for periodically recording a resistance and corresponding stripe height projected from ELGs and ELEs, respectively at pre-selected lapping intervals; (5) a processor that performs statistical and mathematical analysis of the recorded data after a predetermined number of recording periods have elapsed to produce calibration parameters; (6) a control mechanism that dynamically adjusts the position of the ELEs and dynamically adjust the target and lapping pressures, which optimizes row distribution, utilizing the result of the analysis; and (7) a mechanism for effecting the lapping of the thin film resistive element utilizing the calibration parameters.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2 is a block diagram illustrating another configuration of the lapping control mechanism with alternating long and short ELGs according to the prior art;

DETAILED DESCRIPTION OF AN ILLUSTRATIVE EMBODIMENT

The present invention enhances the lapping operation on slider rows of MR elements on a wafer substrate to provide greater accuracy in the calibration of the MR element with respect to its resistance and stripe height. The invention provides an in-situ MR stripe height calibration method capable of operating on-the-fly during the lapping operation. The system is completely self-contained and, thus, wafer element data is not required. The system utilizes a smaller interval sampling technique, which provides a high number of data points that, when filtered and averaged at each location along the element row, provide a much higher calibration accuracy than previously available.

A Generally, the invention provides an electrical contact system that is capable of probing both ELGs and element-like ELGs (ELEs) located in kerfs between elements, or ELGs located in kerfs between elements and actual MR sensors. At carefully chosen lapping intervals, snapshots of the resistance of ELEs or MR elements and their corresponding stripe height, as projected from the ELGs, are stored in memory. Following the acquisition of a predetermined number of snapshots, statistical and mathematical analysis/processing are applied to the data sets in such a way as to provide an accurate and clear relationship equation: $(1/SH)=f(R)$. The actual number of snapshots are pre-selected for maximum accuracy. The statistical and mathematical analysis/processing is completed dynamically by the controller's processor, which controls the calibration system and provides a feed back of the extrapolated resistance versus stripe height relationship.

Figure 7A:
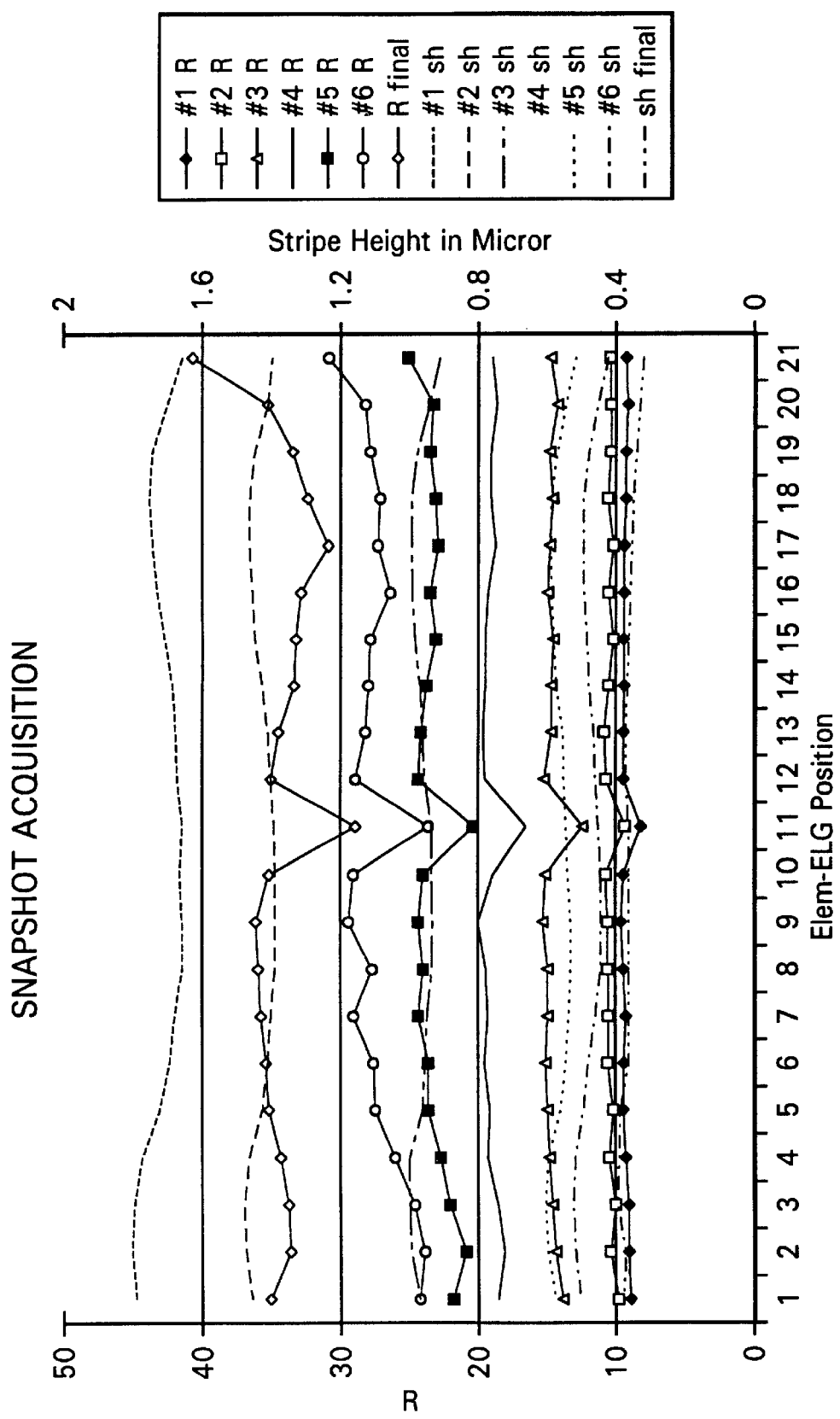
FIG. 7A is a chart illustrating the snapshot acquisition process for a single slider row of a quad.
Figure 7B:
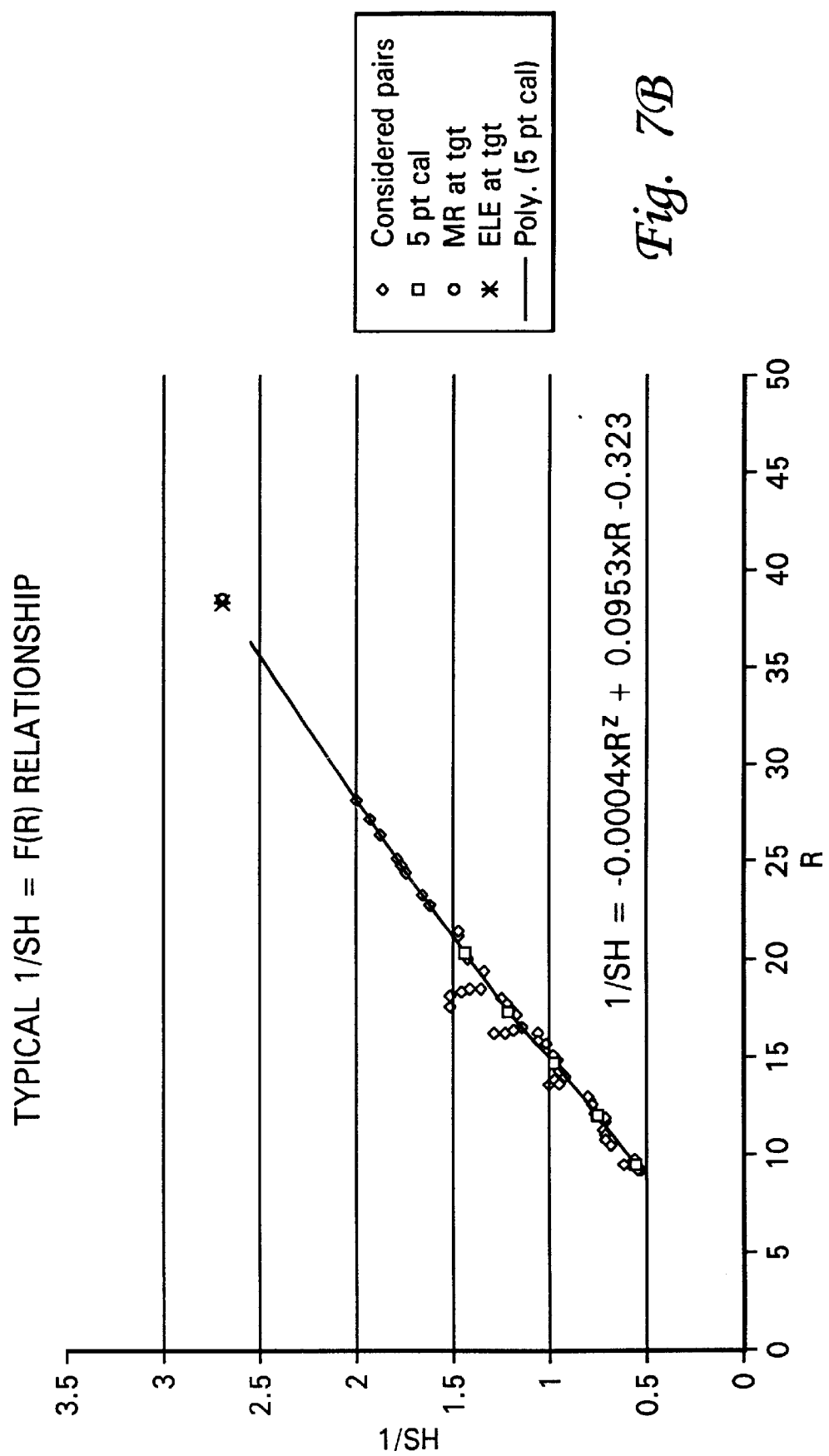
FIG. 7B is a chart illustrating the resistance versus stripe height relationship following the statistical/mathematical analysis of the present invention.

FIG. 7A is a chart illustrating the results of the snapshot acquisition process for a single row of MR elements on the wafer. The chart of FIG. 7B illustrates an accurate $(1/SH)=f(R)$ relationship after proper statistical, filtering, and mathematical analysis, where $f(R)$ is provided as a quadratic having constants a, b, and c derived from the analysis of SH and R data acquired. It is the job of the controller to determine the best mathematical description of the $(1/SH)=f(R)$ relationship, whether a linear, polynomial, exponential, or power function. Thus, although the invention is described in terms of analyzing (abc) constants, this implementation is not meant to be limiting on the invention, and the controller evaluates the best mathematical relationship between the stripe height and resistance.

General lapping control and calibration features of the invention may be completed according to bow compensated lapping (BCL) of wafer quadrants according to U.S. Pat. Nos. 5,531,017 and 6,174,218, the relevant contents of which are hereby incorporated by reference. The actual configuration of the lapping mechanism system is adjusted to incorporate the novel elements of the invention (e.g., utilization of elements like ELGs (ELEs) and recordation and analysis of data collected therefrom).

Figure 1:
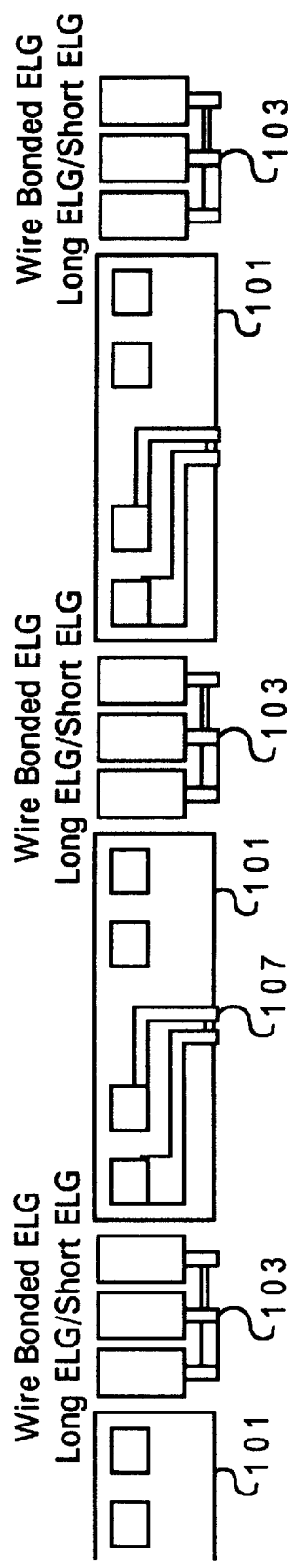
FIG. 1 is a block diagram illustrating one configuration of a lapping control mechanism that utilizes dual element ELGs and wire bonding according to the prior art.
Figure 3A:
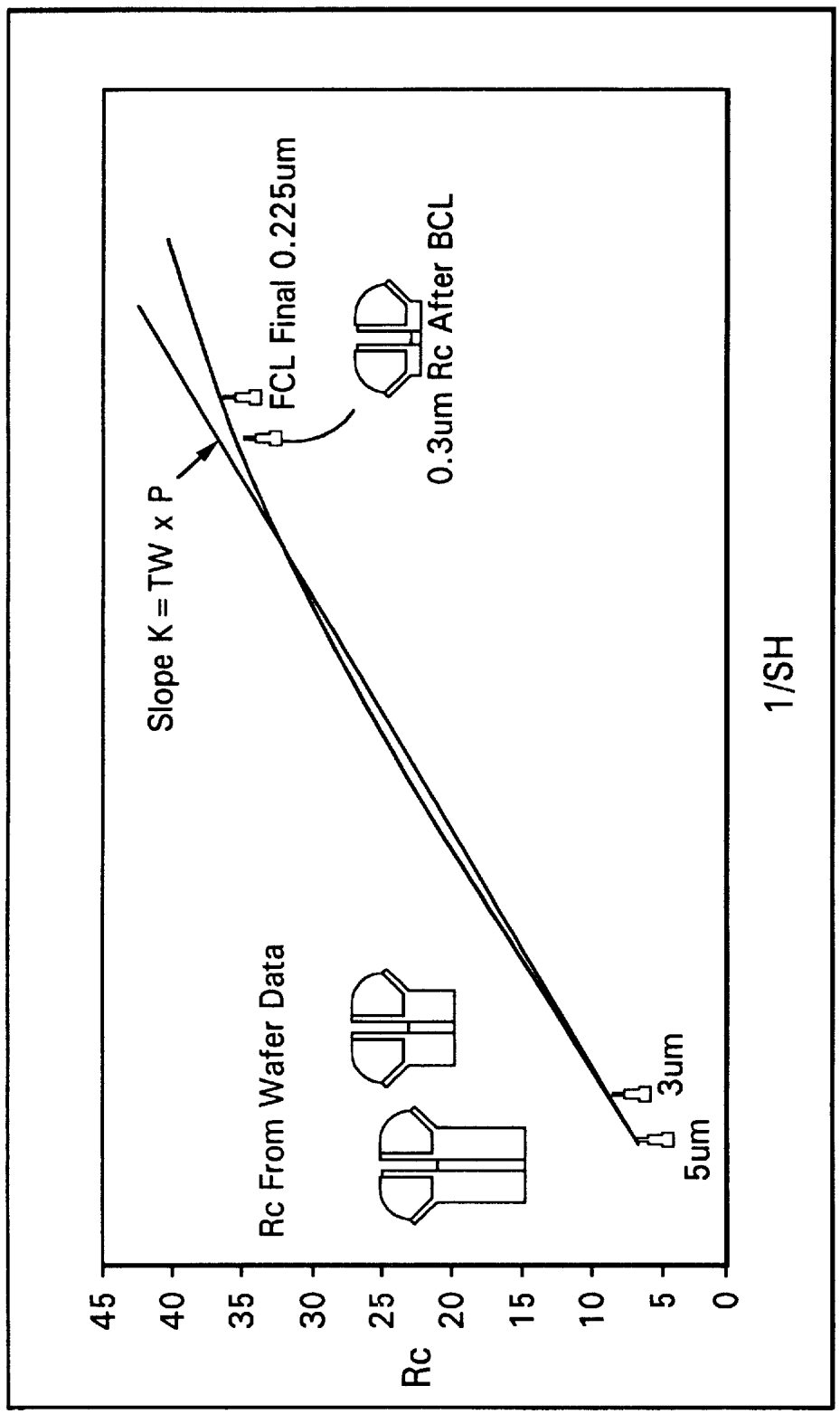
FIG. 3A is a graph illustrating the differences between MR data of untapped wafer elements and MR data following a first BCL operation.
Figure 3B:
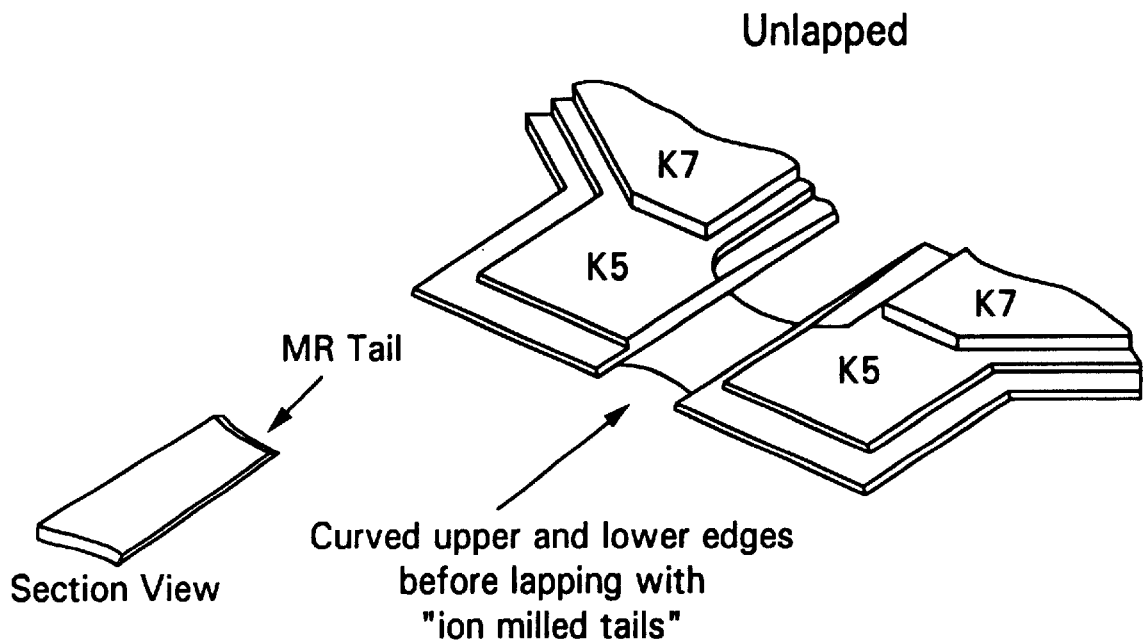
FIGS. 3B and 3C respectively depict a wafer element with untapped and undisturbed edges (with ion milled tails) and the same wafer element following a lapping operation (without ion mill tails)
Figure 3C:
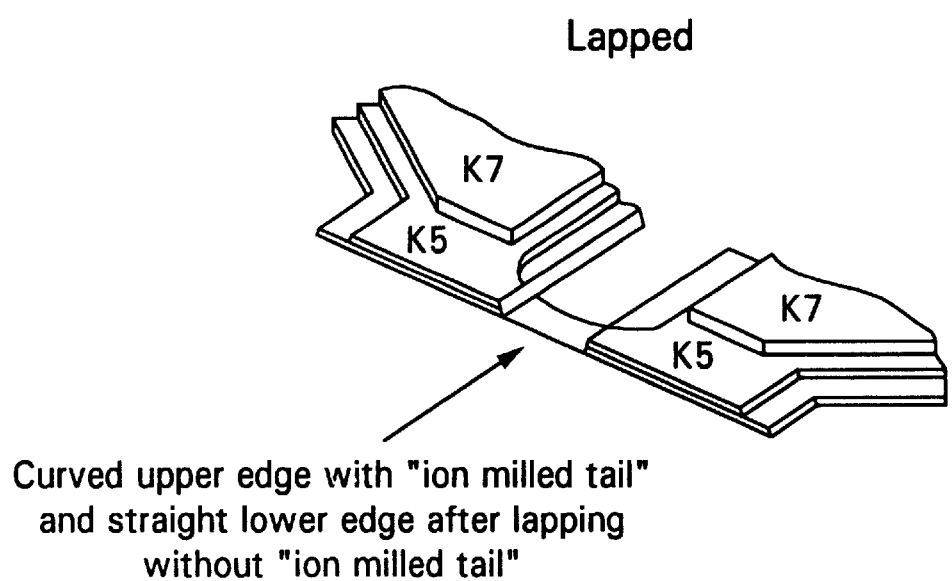
Figure 4A:
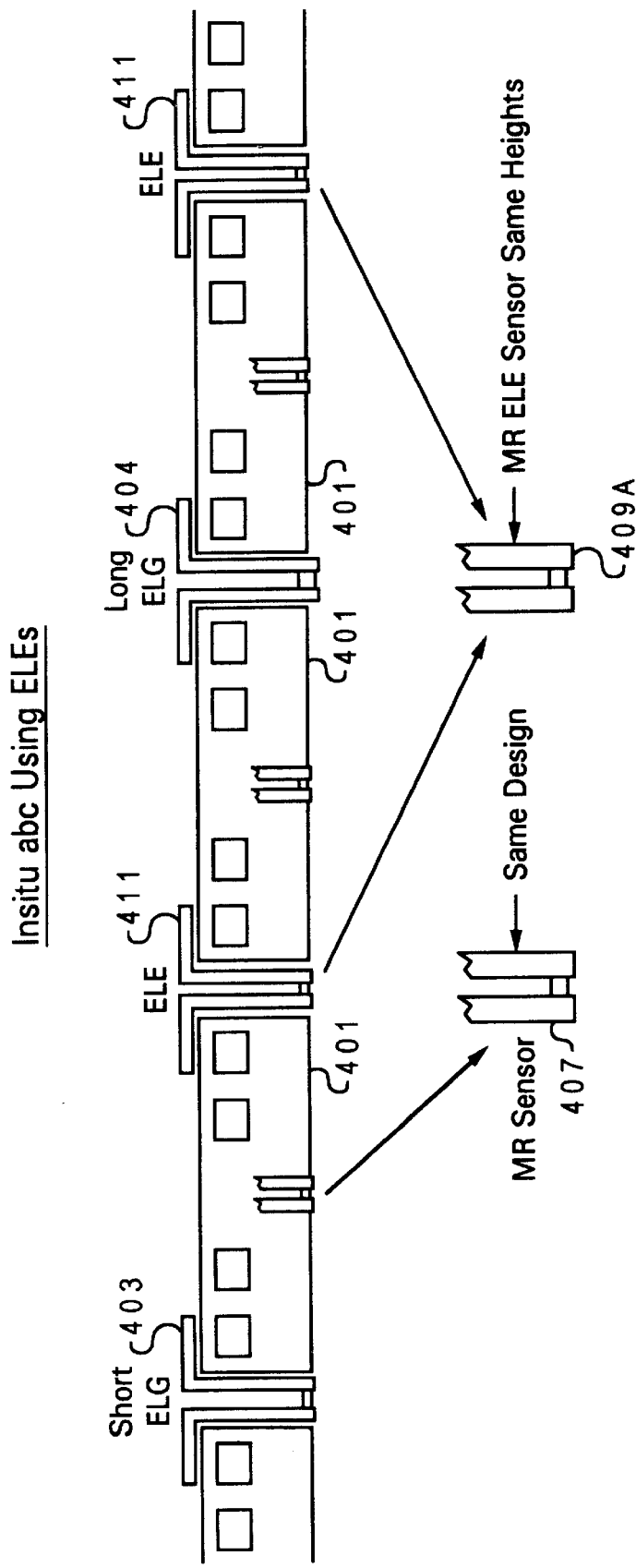
FIG. 4A is a block diagram illustrating one embodiment of the lapping control mechanism with elements like ELGs (ELE) according to the present invention.

With further reference now to the figures and in particular with reference to FIG. 4A, there is depicted a slider row of a quad with lapping control mechanisms positioned therein. As illustrated, the slider row comprises several MR elements 401, each having an MR sensor 407. Positioned within the kerfs of the slider row (i.e., between each MR element) are alternating long and short electrical lapping guides (ELGs) 403 and 404, respectively, and element like ELGs (ELEs) 411. ELGs alternate between short ELG 403 and long ELG 404 to provide calibration of the stripe height according to current methods. Unlike current calibration systems, however, the ELGs 403, 404 are spaced every two kerfs and an ELE 411 is placed in between each pair of ELGs 403, 404. During generation of the wafer, the wafer is cut into quads containing 29 rows of sliders. Each row of sliders contains 43 kerfs separating 44 MR elements. Therefore, according to the illustrative embodiment of the invention, the lapping machine provides 43 ELGS of which approximately half (i.e., 21) are ELEs.

ELEs are called "element like" because each ELE has a base portion that is designed to have substantially similar physical features and resistive functionality with the MR sensors 407 of the slider row. This base portion is also the lapped head of the ELE. As shown in the expanded view, MR sensor 407 and ELE sensor 409A are designed the same and are both positioned at the same height within the slider row. Thus, both the ELE sensors 409A and MR sensors 407 are lapped simultaneously during any lapping operation. Thus, the ELEs 411 provide accurate readings of the resistance of the MR element to which they are adjacent. Because of the higher density of slider rows, the spatial dimension between ELEs is small, enabling a larger number of points for collection of resistance data. Notably, this enables accurate resistance measurements to be recorded along the entire length of the slider row without requiring wire bonding of the MR sensors 407.

According to the illustrative embodiment, either the MR sensors or ELEs are utilized to monitor the resistance characteristics on an ongoing basis, and the data are sampled at regular intervals during the lapping process. The invention realizes that because the MR device track widths are so narrow and wafer process limitations prevent the ability to print extremely short stripe heights, wafer data collected with multiple MR stripe height (i.e., long and short) ELEs are not accurate enough to calibrate MR devices. Thus, the invention utilizes the ELEs at different heights to calibrate the ELGs. Once the ELGs are calibrated, however, the remaining MR element calibration is completed by snapshot acquisition of the resistance data from the ELEs.

Figure 4B:
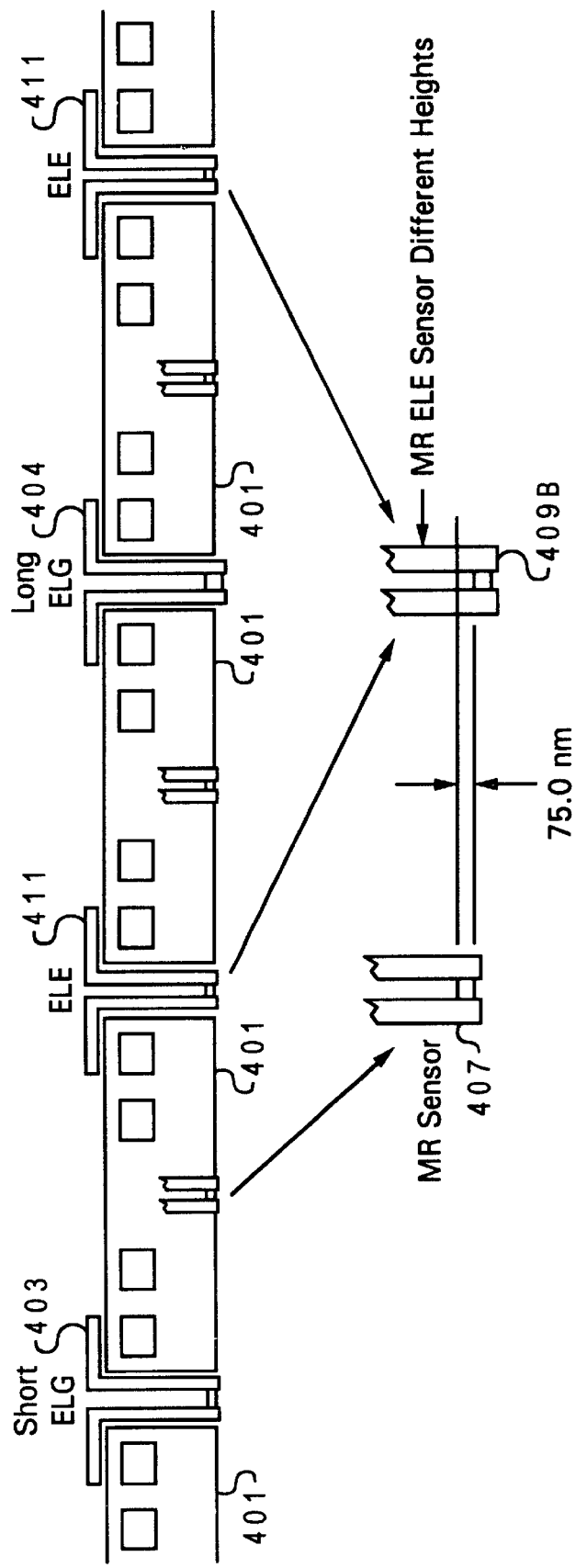
FIG. 4B is a block diagram illustrating another embodiment of the lapping control mechanism with elements like ELGs (ELE) positioned at the height corresponding to the amount of the next lapping operation according to the present invention.

FIG. 4B illustrates the calibration system layout of FIG. 4A, with a differential placement of the ELEs 409B for "predictive" lapping operations. Each similarly numbered component is similar to that of FIG. 4A. FIG. 4A depicts the ELEs on the same level as the MR sensor of the MR element being lapped. However, in FIG. 4B, ELEs (or ELE sensors) 409B are positioned below the level of the MR sensors 407 on the slider row (i.e., at a lower level than the MR sensor of the MR element being lapped). The former configuration provides an extrapolated result, while the latter, preferred configuration provides an interpolated result and enables predictive lapping operations.

ELEs read values of resistance to derive calibration constants (a, b, and c). The resistive data from the ELEs is utilized to generate the constants necessary to describe the non-linear relationship between stripe height and resistance. The higher ELE collection points density leads to a substantially accurate predictive capability. The constants are fed forward to the next lapping operation to determine the stripe height by the resistance values of MR elements.

Referring again to FIG. 4B, the ELEs 409B are positioned at a level corresponding to the height to which the next lapping operation is being completed. In the preferred implementation of the invention, the actual difference in positioning directly corresponds to the amount (height or width) of lapping that is expected to be performed during the next lapping operation. Thus, according to the illustrative embodiment, where lapping occurs in measurements of 75 nanometers, the ELEs 409B are positioned 75 nm below the MR sensor 407. In this way, the lapping operating takes into consideration the end results (i.e., data values) of the ELEs during the current lapping operation. This enables the more accurate prediction of resistance versus stripe height relationship. According to the invention, the algorithm performs an interpolation between the ELEs (and not an extrapolation as would be required when the ELEs are placed at the MR level).

Figure 5:
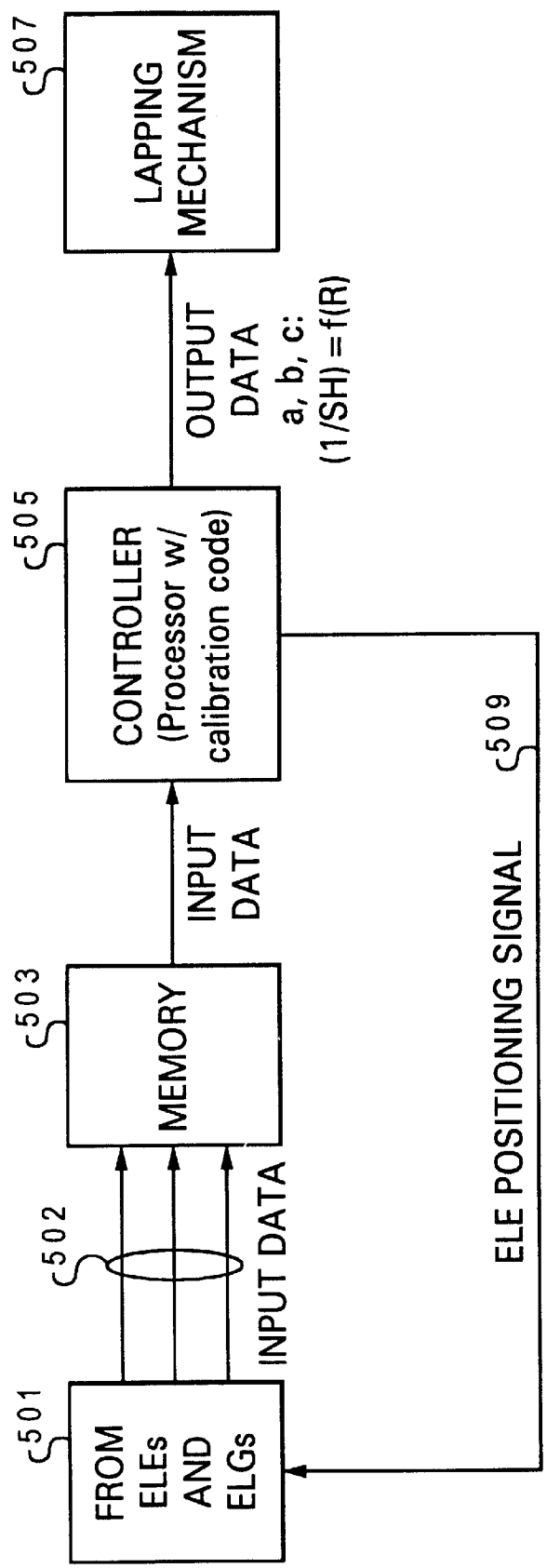
FIG. 5 is a block diagram illustrating one embodiment of the processing components of the calibration and analysis system with associated feedback loop representing the in-situ nature in which the features of the invention are implemented.

FIG. 5 illustrates a block diagram of one embodiment of calibration components utilized to control the lapping operation of the slider rows illustrated in FIGS. 4A and 4B. The lapping control system comprises a controller 505 and lapping mechanism 507, which receives output data from the controller following analysis of resistance and stripe height measurement. Controller 505 receives input from memory 503, which in turn stores input data 502 received from ELEs and ELGs 501. Other than the utilization of and connection to the ELEs, the lapping control system may be generally conventional in nature and such portions shown are done so merely for illustrative purposes and not meant to be limiting on the invention. According to the illustrative embodiment (FIG. 5), controller 505 includes a processor, which analyzes SH and R data received from sampling the ELGs and ELEs 501. The actual amount of pressure applied by lapping mechanism 507 is adjusted by the feed back results 509 from the analysis of the SH and R data received from the periodic sampling of the MR sensors and ELEs. It is understood that any type of calibration system may be utilized so long as the controller/processor is programmed with the code/algorithm required to analyze the resistive and stripe height data received from the ELGs and ELEs and affect the amount of lapping performed on the slider row based on the result of the analysis. The present embodiment operates via the kiss lapp calibration scheme created by International Business Machines, Inc. The initial calibration operation is completed at BCL operation, unlike current operation.

The illustrated components of FIGS. 4A and 4B assume that the wafer quadrant (e.g., a block of thirty slider rows with forty-four MR type sliders in each) is bonded to an extender tool. The above example of a wafer quadrant is not meant to be limiting on the invention and is provided for illustration only.

According to the in-situ calibration system of the invention, the standard ELG devices that provide well known stripe height accuracy are scanned along with the ELEs for data. Once the stripe height to resistance relationship is known for each slider row, the lapping control of the row may be transferred from the ELGs to the ELEs or MR sensors. This enables slight adjustments to be made in target and lapping pressures, which optimizes the distribution of the row. According to one embodiment of the invention, priority may be awarded to either resistance target, stripe height target, or a combination of both. When priority is awarded to a resistance target, a resistance value is targeted within a stripe height window. Alternatively, when priority is awarded to a stripe height target, a stripe height value is targeted within a resistance window.

Figure 6:
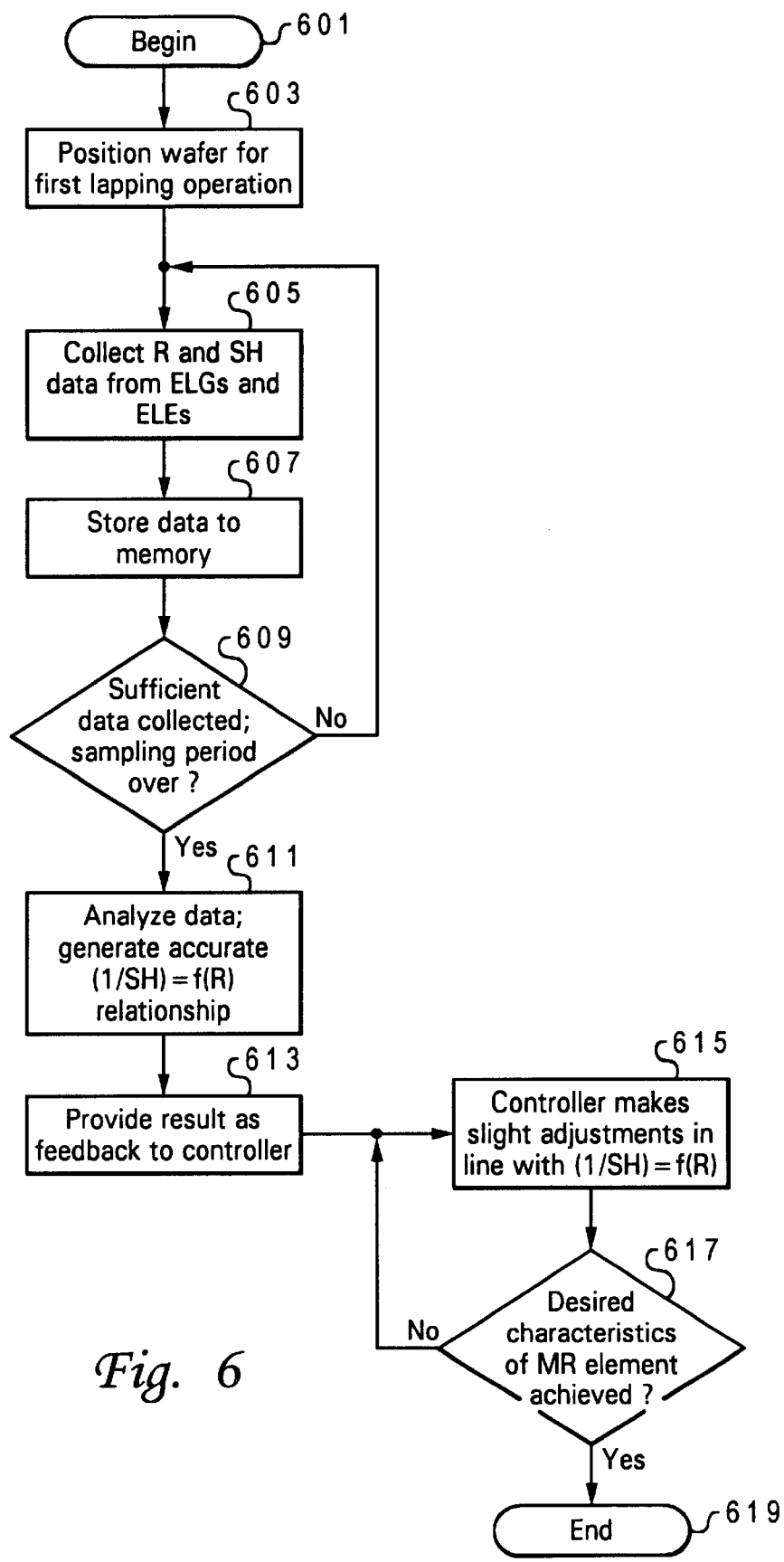
FIG. 6 is a flow chart illustrating the basic processes of performing in-situ calibration of MR elements in accordance with one embodiment of the invention.

FIG. 6 illustrates a flow chart of one embodiment of the general process of providing in-situ calibration of MR sensors. The process begins at block 601 and proceeds to block 603, which indicates positioning the wafer quadrant for the first lapping operation. Then, a snapshot is taken of sample data from numerous data points on an MR element utilizing the ELEs (or MR sensors) as depicted at block 605. Following the snapshot, the collected data is stored in memory as shown at block 607. Then, a determination is made, as shown at block 609, whether sufficient data has been collected for the next calibration analysis. If not, the process returns to block 605, where another snapshot of data is taken.

Thus, at predetermined intervals, or after a predetermined amount of data has been collected, the data is analyzed as depicted at block 611. Following the analysis, the resulting relationship equation ((1/SH)=f(R)) is fed back to the calibration control system (e.g., controller 505), as shown at block 613. The controller 505 then provides slight adjustments to the lapping process (e.g., the pressure applied by each of the actuators forcing the lapping operation), as depicted at block 615, to enable more accurate lapping of the MR element. The MR element is then lapped to the distance equal to the extension of the ELEs below the MR sensor, when the predictive lapping method described herein is implemented. Because ELEs are positioned below the MR devices at a distance equal to the distance lapped of the second lapping operation, the ELE resistance will be equal to the MR element resistance at the end of the second lapping operation. Following the lapping operation, a determination is made, based on the readings of the ELEs and ELGs, whether the desired characteristics have been attained, as depicted at block 617. Once the MR element acquires the desired characteristics, the lapping process ends, as shown at block 619. Otherwise the data collection and lapping process is repeated.

One primary advantage of the invention is to create an accurate relationship between element resistance and its stripe height while the wafer/row element is being worked on, hence, providing means to target either resistance, stripe height, or a combination of both. In one implementation, the manufacturer is able to select between a characteristic to monitor from among resistance, stripe height, and a combination of both. Thus, input is received prior to the start of the lapping process to indicate whether the process targets resistance or stripe height, or a combination of both. The input causes specific adjustments to be made to the calibration process related to the specific feature desired to be targeted.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for enhancing calibration of magneto resistive (MR) elements formed on a wafer during manufacture of said elements, said method comprising:
    collecting via a plurality of ELEs and ELGs a high frequency sampling of data related to element resistance and stripe height of said MR element during an ongoing lapping operation, wherein said plurality of ELEs are positioned in alternating kerfs between a long and a short ELG to provide more accurate resistance data sensors, such that said ELGS are not wire-bonded to MR sensors;
    analyzing said data to determine accurate relationship characteristics between stripe height and resistance of said MR element;
    providing a result of said analysis to a calibration component utilized to control lapping parameters and adjustment of lapping dimensions; and
    dynamically controlling said lapping operation on said MR element utilizing said results with MR sensor component, which includes said ELEs, to make adjustments to said lapping dimensions, while the lapping operating is ongoing.

2. The method of claim 1, wherein:
    said collecting step comprises selecting a parameter to monitor from among resistance, stripe height, and a combination of both resistance and stripe height; and
    said dynamically controlling step controls said lapping operation to yield a desired characteristic of said parameter selected.

3. The method of claim 1, wherein:
    a lapped head of each of said ELEs exhibits similar characteristics to an MR sensor, such that wire bonding of said ELGs to said MR sensors is not required;
    said collecting step comprises positioning said ELEs at or below a level of the MR elements, wherein when said ELEs are position below the level of the MR elements, the data recorded indicates measured resistance and stripe height data at a height indicative of the end of an ongoing lapping operation; and
    said analyzing step comprises interpolating resistance and stripe height distances prior to final kiss lapping operation based on said measured resistance and stripe height data.

4. The method of claim 1, wherein:
    said collecting step further comprises:
        measuring stripe height data utilizing a plurality of electrical lapping guides (ELGs), wherein said ELGs are not wire-bonded to MR sensors; and
        storing said stripe height data in memory; and said analyzing step applies said stripe height information to MR sensors in real time.

5. The method of claim 1, further comprising positioning a stripe height of each of said ELEs lower than a height of the MR elements such that said ELEs collect resistance data at a stripe height lower than nominal stripe heights at a second lapping, and lapping analysis is performed by interpolation of collected data.

6. The method of claim 1, wherein said analyzing step includes correlating unique stripe height with resistance on a row by row basis.

7. The method of claim 1, wherein said further collecting step collects data by snapshot acquisition utilizing said ELEs.

8. The method of claim 1, further comprising:
    positioning the ELEs below the MR sensors in such a way as to end the lapping operation at the targeted height of the MR sensors after the final kiss lap operation.

9. The method of claim 8, wherein said positioning step positions the ELEs at a height of a next kiss lap operation.

10. The method of claim 8, wherein said positioning step positions the ELEs at a height determined by an operator, wherein said height represents a desired lower limit given a target of a final kiss lap operation.

11. The method of claim 1 wherein said analyzing step includes filtering and averaging said data at each of a plurality of selected locations; and wherein said analyzing includes interpolating data collected during the ongoing lapping operation by the ELEs to provide a calibration result that determines factors which indicate when a desired resistance-stripe height relationship is attained.

12. A lapping control system for performing in-situ calibration of stripe height and resistance characteristics of a deposited thin film resistive material on a wafer, said system comprising:
    a plurality of thin film resistive elements of said thin film resistive material having a height dimension and corresponding resistance, said plurality of resistive elements configured in rows, each separated by a kerf;
    an electrical resistance detector for measuring the resistance of each resistive element;
    an electrical contact system comprising ELGs and MR sensors located in kerfs between MR elements and spaced to provide a large number of contact points, wherein said MR sensors include a plurality of ELEs placed in alternating kerfs between a short ELG and a long ELG and which exhibit some similar functionality as MR sensors, such that wire bonding of said ELGs to said MR sensors is not required;

means for periodically recording a resistance and corresponding stripe height projected from ELGs and MR elements at pre-selected lapping intervals;

means for performing statistical and mathematical analysis of said recorded data after a predetermined number of recording periods have elapsed;

means for dynamically adjusting target and lapping pressures, which optimizes row distribution, utilizing said result of said analysis during an ongoing lapping operation.

13. The lapping control system of claim 12, further comprising storage means for storing said recorded data.

14. The lapping control system of claim 12, wherein said means for performing said analysis includes means for determining a substantially accurate relationship between said stripe height and said resistance represented as $(1/SH)=f(R)$ for each row of said material.

15. The lapping control system of claim 12, further comprising means for transferring lapping control of the row from ELGs to said MR sensors.

16. The lapping control system of claim 12, further comprising means for selecting a controlling characteristic from among element resistance, stripe height, and a combination of both, wherein selection of element resistance initiates a control of said resistance within a stripe height window, and selection of stripe height initiates a control of said stripe height within a resistance window.

17. The lapping control system of claim 16, further comprising means for receiving an input indicating which characteristic is to be selected as a target.

18. The lapping control system of claim 16, further comprising means for performing said analysis with offset parameters associated with said selected target.

19. The lapping control system of claim 12, wherein said MR sensors include wafer MR sensors and element-like ELGs (ELEs).

20. The lapping control system of claim 19, wherein said analysis includes filtering and averaging said data at each of a plurality of selected locations; and wherein said analyzing includes interpolating data collected during the ongoing lapping operation by the ELEs to provide a calibration result that determines factors which indicate when a desired resistance-stripe height relationship is attained.

21. The lapping control system of claim 19, further comprising means for positioning said ELEs below said wafer MR sensors, wherein a lapping operation after a final kiss lap ends at a targeted height of the MR sensors, based on the distance of said ELEs below said wafer MR sensors.

22. A method for lapping a plurality of batch fabricated thin film magnetic transducers formed in a row on a substrate, each of said transducer comprising a magneto resistive (MR) element having a height defining edge and exhibiting a corresponding resistance, said method comprising the steps of:

measuring the resistance of each of said magneto resistive elements during lapping of said height defining edge, wherein said measuring is completed by a plurality of ELEs placed in alternating kerfs between a short ELG and a long ELG, and wherein said ELEs are placed at or below a level of MR elements in order to more accurately measure data found at the level of final lapping operation, wherein further said ELEs exhibit some similar functionality as MR sensors, such that wire bonding of said ELGs to said MR sensors is not required;

calculating, in response to said measured resistances of each of said magneto resistive elements before said lapping reduces any of said height defining edges, a substantially accurate relationship between a height of said MR elements and said corresponding resistance, wherein said calculating step involves interpolating data when said ELEs are placed below the level of the MR elements;

calibrating, in response to a result of said calculating step, a lapping mechanism to perform lapping according to a desired output; and terminating said lapping process when a predetermined element height is reached for each of said MR elements.

23. The method of claim 22, wherein said measuring step includes:

measuring said strip height utilizing a plurality of electrical lapping guides (ELGs); and measuring said resistance utilizing a plurality of element-like ELGs (ELEs) positioned in kerfs of a wafer comprising said thin film magnetic transducers.

24. The method of claim 23, wherein said calibrating step accurately obtains a desired element height of each of said magnetoresistive elements to a next kiss lap level.

25. The method of claim 23, wherein said calibrating step accurately obtains a desired element resistance of each of said magnetoresistive elements to a next kiss lap level.

26. The method of claim 23, wherein said calibrating step obtains a substantially accurate element height and element resistance of each of said magnetoresistive elements.

27. A method for accurately measuring the resistance and stripe height relationship of a deposited thin film resistive material, deposited in rows on a wafer, with each row separated by a kerf, said method comprising the steps of:

placing a plurality of ELGs on said wafer to measure a stripe height of said material;

placing a plurality of MR sensors and element-like ELGs (ELEs) within said kerfs to measure a resistance in real time, wherein said plurality of ELEs are placed in alternating kerfs between a short ELG and a long ELG, and wherein said ELEs are placed at or below a level of MR elements in order to more accurately measure data found at the level of final lapping operation, and wherein further said ELEs exhibit some similar functionality as MR sensors, such that wire bonding of said ELGs to said MR sensors is not required;

sampling data related to said resistance and said stripe height at a high frequency, wherein said sampling provides a high number of data readings;

analyzing said data to produce an accurate relationship of said stripe height versus said resistance, wherein said analyzing involves interpolating data when said ELEs are placed below the level of the MR elements;

adjusting a lapping control mechanism based on a result of said analysis to produce an accurate end product of said material; and terminating said adjusting and lapping operation when a predetermined characteristic is achieved.

28. The method of claim 27, wherein said relationship is represented by a formula $(1/SH)=f(R)$.

29. The method of claim 27, wherein said predetermined characteristic is a characteristic related to a parameter of said material from among said resistance, said stripe height, and a combination of said resistance and said stripe height.

30. A lapping control system for accurately obtaining a desired characteristic of a plurality of batch fabricated thin film magnetic transducers formed in a row on a substrate comprising:

at least one thin film magnetic transducers formed in said row comprising a set of magneto resistive elements, having a height defining edge and exhibiting a corresponding resistance;

an electrical resistance detector for retrieving a large number of data measurements of the resistance of said magneto resistive element during lapping of said height defining edge, said detector comprising a plurality of ELEs placed in alternating kerfs between a short ELG and a long ELG, and wherein said ELEs are placed at or below a level of MR elements in order to more accurately measure data found at the level of final lapping operation and wherein further said ELEs exhibit some similar functionality as MR sensors, such that wire bonding of said ELGs to said MR sensors is not required;

a processor for analyzing said measured resistance and an associated height of said MR element and calculating a substantially accurate relationship between both utilizing said large number of data measurements;

means for periodically recording a resistance and corresponding stripe height projected from ELGs and MR elements at pre-selected lapping intervals;

means for performing statistical and mathematical analysis of said recorded data after a predetermined number of recording periods have elapsed, wherein said analysis involves interpolating data when said ELEs are placed below the level of the MR elements;

a lapping control component that:

responsive to a result of said statistical analysis for at least one of said magneto resistive elements, dynamically adjusts target and lapping pressures, which optimizes row distribution, utilizing said result of said analysis;

terminates said lapping process when said desired characteristic is obtained for said magneto resistive elements.

31. The lapping control system of claim 30, wherein said electrical resistance detector comprises an electrical contact system comprising ELGs and MR sensors located in kerfs between elements and spaced to provide a large number of contact points.

32. The lapping control system of claim 31, wherein said MR sensors includes element ELGs (ELEs).

33. The lapping control system of claim 30 wherein said desired characteristics is an design characteristic of a parameter of said magneto resistive elements from among said resistance, said stripe height, and a combination of said resistance and said stripe height.

* * * * *